US012645774B2

(12) United States Patent
Liao et al.

(10) Patent No.: US 12,645,774 B2
(45) Date of Patent: Jun. 2, 2026

(54) INFORMATION AUTHENTICATION

(71) Applicant: BEIJING BAIDU NETCOM SCIENCE TECHNOLOGY CO., LTD., Beijing (CN)

(72) Inventors: Pochang Liao, Beijing (CN); Shuhe Wang, Beijing (CN); Pengfei Zhong, Beijing (CN); Jiawei Liao, Beijing (CN); Xiaohua Ren, Beijing (CN); Xiaolin Huang, Beijing (CN); Huibin Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 589 days.

(21) Appl. No.: 17/819,258

(22) Filed: Aug. 11, 2022

(65) Prior Publication Data

US 2022/0382841 A1     Dec. 1, 2022

(30) Foreign Application Priority Data

Aug. 18, 2021     (CN) ........................ 202110950494.X

(51) Int. Cl.
G06F 21/32 (2013.01)
G06V 10/74 (2022.01)
(Continued)

(52) U.S. Cl.
CPC ............ G06F 21/32 (2013.01); G06V 10/761 (2022.01); G06V 10/945 (2022.01); G06V 40/172 (2022.01); G06V 2201/07 (2022.01)

(58) Field of Classification Search
CPC .... G06F 21/32; G06V 10/761; G06V 40/172; G06V 10/945; G06V 2201/07
See application file for complete search history.

(56) References Cited

U.S. PATENT DOCUMENTS

| | | | |
|---|---|---|---|
| 2013/0226632 A1* | 8/2013 | Gilbert ................... | G06Q 10/02 705/5 |
| 2016/0027079 A1 | 1/2016 | Schoeffler | |
| 2020/0410074 A1* | 12/2020 | Dang ............... | G06V 30/19173 |

FOREIGN PATENT DOCUMENTS

| | | |
|---|---|---|
| CN | 106203294 A | 12/2016 |
| CN | 109359548 A | 2/2019 |

(Continued)

OTHER PUBLICATIONS

Search Report for CN Application No. 202110950494X, issued on Apr. 14, 2022, 2 pages.

(Continued)

*Primary Examiner* — Wednel Cadeau
(74) *Attorney, Agent, or Firm* — FisherBroyles, LLP

(57) ABSTRACT

An information authentication method is provided. The method includes: determining a plurality of first objects in a target image; determining at least one second object in the target image; and executing, for each of the plurality of first objects, a first authentication operation including: determining whether the at least one second object includes a second object associated with the first object; performing first authentication on the second object associated with the first object in response to determining that the at least one second object includes the second object associated with the first object to obtain a first authentication result of the first object; and outputting the first authentication result.

13 Claims, 7 Drawing Sheets

(51) Int. Cl.
*G06V 10/94* (2022.01)
*G06V 40/16* (2022.01)

(56) References Cited

FOREIGN PATENT DOCUMENTS

| | | | |
|---|---|---|---|
| CN | 111046810 A | | 4/2020 |
| CN | 111191567 A | | 5/2020 |
| CN | 111680179 A | | 9/2020 |
| CN | 112819984 A | | 5/2021 |
| CN | 112837454 A | | 5/2021 |
| JP | 2016018406 A | * | 2/2016 |
| JP | 2019530041 A | | 10/2019 |
| JP | 2021516819 A | | 7/2021 |
| KR | 20200118842 A | | 10/2020 |
| WO | 2016208121 A1 | | 12/2016 |
| WO | 2020022014 A1 | | 1/2020 |

OTHER PUBLICATIONS

Supplementary Search Report for CN Application No. 202110950494X, issued on Jun. 28, 2022, 1 page.
Office Action from related JP Application No. 2022-129378, issued Jun. 20, 2023, 6 pages.
1st Office Action of the counterpart KR application No. 10-2022-0102437, official mailing mate: Jun. 14, 2024, 7 pages.

* cited by examiner

205

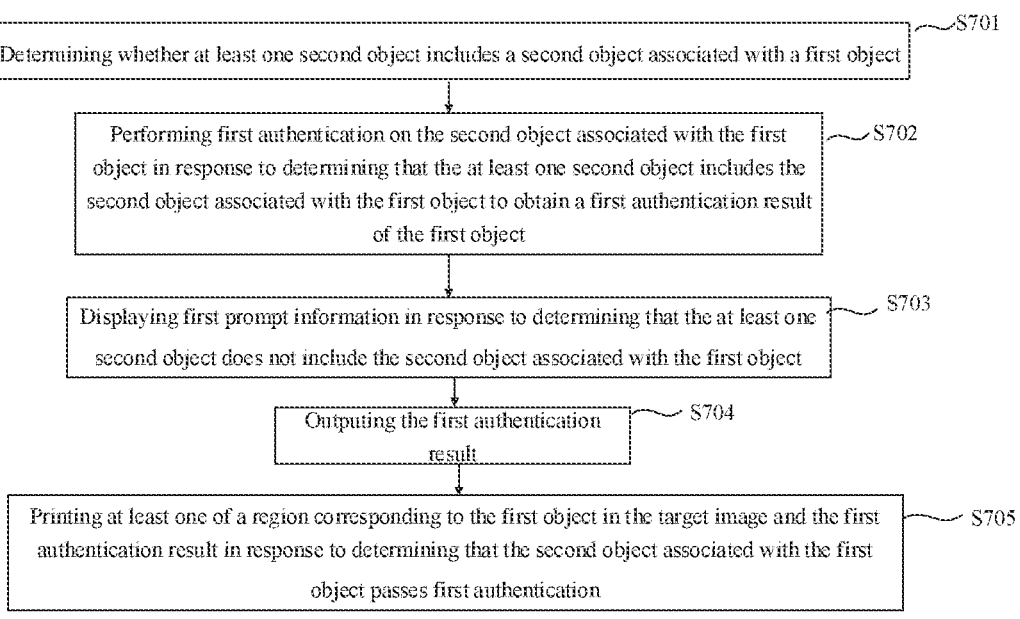

S701

Determining whether at least one second object includes a second object associated with a first object

S702

Performing first authentication on the second object associated with the first object in response to determining that the at least one second object includes the second object associated with the first object to obtain a first authentication result of the first object

S703

Displaying first prompt information in response to determining that the at least one second object does not include the second object associated with the first object

S704

Outputting the first authentication result

S705

Printing at least one of a region corresponding to the first object in the target image and the first authentication result in response to determining that the second object associated with the first object passes first authentication

Fig. 7

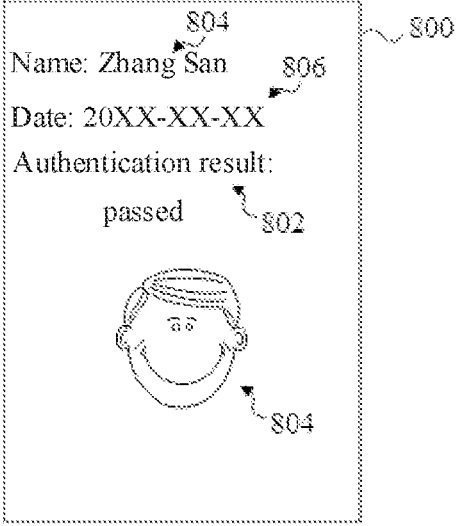

Name: Zhang San   804   806

Date: 20XX-XX-XX

Authentication result:

passed   802

INFORMATION AUTHENTICATION

CROSS REFERENCE OF RELATED APPLICATIONS

This application claims priority to Chinese Patent Application No. 202110950494.X, filed on Aug. 18, 2021, the contents of which are hereby incorporated by reference in their entireties.

TECHNICAL FIELD

The present disclosure relates to the field of computers, and specifically relates to computer vision, image processing and augmented reality technologies, in particular to an information authentication method and apparatus, an electronic device, a computer readable storage medium and a computer program product.

BACKGROUND

Artificial intelligence is a subject of studying to make computers simulate certain human thinking processes and intelligent behaviors (for example, learning, reasoning, thinking, planning and the like), and involves both hardware-level technologies and software-level technologies. The artificial intelligence hardware technology generally relates to technologies for, such as, sensors, dedicated artificial intelligence chips, cloud computing, distributed storage and big data processing. The artificial intelligence software technology mainly includes several main computer vision technology, voice recognition technology, natural language processing technology, machine learning/deep learning, big data processing technology, knowledge mapping technology and other major directions.

With development of relevant technologies, the application scenes of vision-based information authentication methods such as face recognition, ID verification and authentication are becoming more and more extensive. Most of existing information authentication methods are performed in a simple scene, but the accuracy, robustness and real-time performance of these methods are all challenged in a complex scene.

The approaches described in this section is not necessarily approaches that have been envisaged or adopted before. Unless otherwise indicated, it should not be assumed that any of the approaches described in this section is regarded as prior art merely by virtue of their inclusion in this part. Likewise, unless otherwise indicated, the problem mentioned in this section should not be considered to be recognized in any prior art.

SUMMARY

The present disclosure provides an information authentication method and apparatus, an electronic device, a computer readable storage medium and a computer program product.

According to an aspect of the present disclosure, an information authentication method is provided. The information authentication method includes: determining a plurality of first objects in a target image; determining at least one second object in the target image; and performing, for each of the plurality of first objects, a first authentication operation including: determining whether the at least one second object includes a second object associated with the first object; performing first authentication on the second object associated with the first object in response to determining that the at least one second object includes the second object associated with the first object to obtain a first authentication result of the first object; and outputting the first authentication result.

According to another aspect of the present disclosure, an information authentication apparatus is provided. The information authentication apparatus includes: a first determining unit, configured to determine a plurality of first objects in a target image; a second determining unit, configured to determine at least one second object in the target image; and an authentication unit, configured to perform a first authentication operation for each of the plurality of first objects, wherein the authentication unit includes: a determining sub-unit, configured to determine whether the at least one second object includes a second object associated with the first object; an authentication sub-unit, configured to perform first authentication on the second object associated with the first object in response to determining that the at least one second object includes the second object associated with the first object to obtain a first authentication result of the first object; and an output sub-unit, outputting the first authentication result.

According to another aspect of the present disclosure, an electronic device is provided and includes: one or more processors; and a memory storing one or more programs configured to be performed by the one or more processors, the one or more programs including instructions for: determining a plurality of first objects in a target image; determining at least one second object in the target image; and performing, for each of the plurality of first objects, a first authentication operation including: determining whether the at least one second object includes a second object associated with the first object; performing first authentication on the second object associated with the first object in response to determining that the at least one second object includes the second object associated with the first object to obtain a first authentication result of the first object; and outputting the first authentication result.

According to another aspect of the present disclosure, a non-transitory computer readable storage medium storing one or more programs, the one or more programs including instructions, which when performed by one or more processors of an electronic device, cause the electronic device to: determine a plurality of first objects in a target image; determine at least one second object in the target image; and perform, for each of the plurality of first objects, a first authentication operation including: determining whether the at least one second object includes a second object associated with the first object; performing first authentication on the second object associated with the first object in response to determining that the at least one second object includes the second object associated with the first object to obtain a first authentication result of the first object; and outputting the first authentication result.

According to another aspect of the present disclosure, a computer program product is provided and includes a computer program, where the computer program, when performed by a processor, implements the above information authentication method.

The method of the present disclosure can improve processing efficiency of information authentication, and meanwhile improve user experience.

It should be understood that described contents in this section are neither intended to indicate key or important features of the embodiments of the present disclosure, nor used to limit the scope of the present disclosure. Other features of the present disclosure will become easier to understand through the following specification.

BRIEF DESCRIPTION OF THE DRAWINGS

Accompanying drawings, which constitute a part of the specification, illustrate examples and embodiments and, together with text description of the specification, serve to explain example implementations of the embodiments. The illustrated embodiments are only intended to serve as examples without limiting the scope of the claims. In all the drawings, the same reference numbers represent similar but not necessarily the same elements.

FIG. 7 shows a flowchart of a first authentication operation according to an example embodiment of the present disclosure.

FIG. 8 shows a schematic diagram of authentication result information according to an example embodiment of the present disclosure.

DETAILED DESCRIPTION OF THE EMBODIMENTS

Example embodiments of the present disclosure are described below with reference to the drawings, which include various details of the embodiments of the present disclosure for better understanding and should be regarded as only examples. Therefore, those ordinarily skilled in the art should realize that various changes and modifications can be made to embodiments described herein without departing from the scope of the present disclosure. Similarly, for the sake of being clear and concise, description of known functions and structures are omitted in the following description.

In the present disclosure, unless otherwise stated, terms such as "first" and "second" used for describing various elements are not intended to limit a position relation, a sequential relation or a significance relation of these elements and are only used for distinguishing one component from another component. In some examples, a first element and a second element may refer to the same instance of the elements, which, in some cases, may also refer to different instances on the basis of description of the context.

Terms used in description of various examples in the present disclosure are only intended to describe specific examples but not intended to make a limitation. Unless otherwise indicated clearly in the context, if a quantity of elements is not limited in particular, there may be one or a plurality of the elements. Besides, a term "and/or" used in the present disclosure covers any one or all possible combinations in listed items.

In the related art, an existing information authentication method performs information authentication on a plurality of users one by one, so when there are many users, processing efficiency is low, and user experience is affected.

In order to solve the above problem, the present disclosure realizes information authentication for second objects associated with a plurality of first objects correspondingly at the same time by determining the plurality of first objects (for example, a human face) and at least one second object (for example, information to be authenticated such as a pass code, a certificate and the like), determining a second object associated with the first objects among the at least one second object and then performing authentication on these second objects so that a corresponding first authentication result is obtained and output. Compared with performing authentication on the second objects associated with the plurality of first objects correspondingly one by one, the method of the present disclosure can improve processing efficiency of information authentication and meanwhile improve user experience.

The embodiments of the present disclosure will be described in detail below with reference to the drawings.

Figure 1:
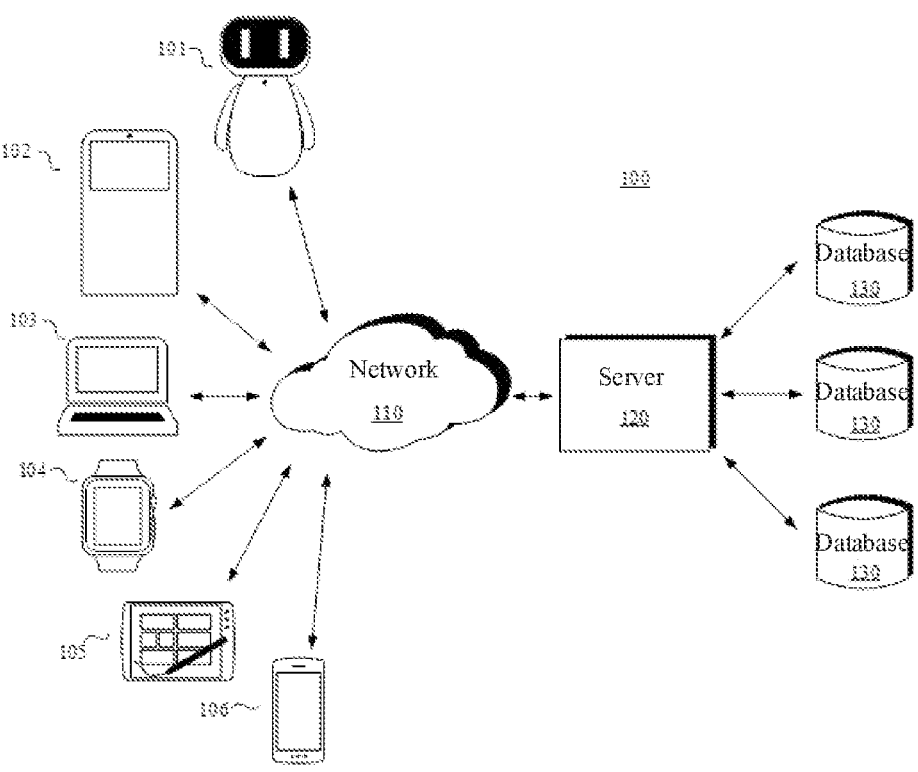
FIG. 1 shows a schematic diagram of an example system where various methods described herein can be implemented according to an embodiment of the present disclosure.

FIG. 1 shows a schematic diagram of an example system 100 where various methods and apparatuses described herein can be implemented according to an embodiment of the present disclosure. Referring to FIG. 1, the system 100 includes one or more client devices 101, 102, 103, 104, 105 or 106, a server 120 and one or more communication networks 110 coupling one or more client devices to the server 120. The client devices 101, 102, 103, 104, 105 and 106 may be configured to execute one or more application programs.

In the embodiment of the present disclosure, the server 120 can run one or more services or software applications capable of executing an information authentication method.

In some embodiments, the server 120 may also provide other services or software applications which may include a non-virtual environment and a virtual environment. In some embodiments, these services may be provided as services based on web or cloud services, for example, provided for a user of the client device 101, 102, 103, 104, 105 and/or 106 in a software as a service (SaaS) mode.

In configuration shown in FIG. 1, the server 120 may include one or a plurality of components which realize functions executed by the server 120. These components may include a software component, a hardware component or their combination capable of being executed by one or more processors. The user who operates the client device 101, 102, 103, 104, 105 and/or 106 can sequentially use one or more client application programs to interact with the server 120 to use services provided by these components. It should be understood that various system configurations are possible and may be different from the system 100. Therefore, FIG. 1 is an example of a system used for implementing various methods described herein and is not intended to make a limitation.

The user can use the client device 101, 102, 103, 104, 105 and/or 106 to perform information authentication. The client device can provide an interface capable of enabling the user of the client device to interact with the client device, for example, a client can photograph a target image including the user through an image collection device. The client device can also output information to the user via the interface, for example, the client can output an information authentication result to the user. Though FIG. 1 describes only six client devices, those skilled in the art can understand that the present disclosure can support any quantity of client devices.

The client device 101, 102, 103, 104, 105 and/or 106 may include various computer devices, for example, a service robot, a self-service terminal, a portable hand-held device, a general-purpose computer (such as personal computer and a laptop computer), a workstation computer, a wearable device, a game system, a thin client, various messaging devices, a sensor or other sensing devices, etc. These computer devices can run software application programs and operating systems of various types and versions, for example, MICROSOFT Windows, APPLE iOS, a UNIX-like operating system, Linux or a Linux-like operating system (for example, GOOGLE Chrome OS); or include various mobile operating systems, for example, MICROSOFT Windows Mobile OS, iOS, Windows Phone, and Android. The portable hand-held device may include a cell phone, a smartphone, a tablet PC, a personal digital assistant (PDA), etc. The wearable device may include a head-mounted display and other devices. The game system may include various hand-held game devices, game devices supporting the Internet, etc. The client device can execute various application programs, for example, various application programs related to the Internet, communication application programs (for example, an e-mail application program) and short message service (SMS) application programs and can use various communication protocols.

The network 110 may be any type of network well known to those killed in the art and can use any one type of various available protocols (including but not limited to TCP/IP, SNA, IPX, etc.) to support data communication. Only serving as an example, one or more networks 110 may be a local area network (LAN), a network based on Ethernet, a Token ring, a wide area network (WAN), Internet, a virtual network, a virtual private network (VPN), an intranet, an extranet, a public switched telephone network (PSTN), an Infrared network, a wireless network (for example, Bluetooth, WIFI) and/or any combination of these and/or other networks.

The server 120 may include one or more general-purpose computers, special-purpose server computers (for example, a personal computer (PC) server, a UNIX server and a mid-range server), a blade server, a mainframe computer, a server cluster or any of other appropriate layouts and/or combinations. The server 120 may include one or more virtual machines which run a virtual operating system, or involve other virtualized computing architectures (for example, one or more flexible pools of a logical storage device of a virtual storage device capable of being virtualized to maintain the server). In various embodiments, the server 120 can run one or more services or software applications providing functions described below.

A computing unit in the server 120 can run one or more operating systems including any of above operating systems and any of commercially applicable server operating systems. The server 120 can also run any one of various additional server application programs and/or middle-layer application programs, including an HTTP server, a FTP server, a CGI server, JAVA server, a database server, etc.

In some implementations, the server 120 may include one or more application programs to analyze and merge data feed and/or incident updating received from the user of the client device 101, 102, 103, 104, 105 and 106. The server 120 may also include one or more application programs to display data feed and/or real-time incidents via one or more display devices of the client device 101, 102, 103, 104, 105 and 106.

In some implementations, the server 120 may be a server of a distributed system, or a server combined with a blockchain. The server 120 may also be a cloud server, or an intelligent cloud computing server or an intelligent cloud host with an artificial intelligence technology. The cloud server is a host product in a cloud computing service system to overcome defects of high management difficulty and weak business expansibility in services of a traditional physical host and the Virtual Private Server (VPS).

The system 100 may also include one or more databases 130. In some embodiments, these databases may be used for storing data and other information. For example, one or more databases 130 may be used for storing information such as audio files and video files. The databases 130 may reside in various positions. For example, the database used by the server 120 may be in the locality of the server 120, or may be away from the server 120 and can communicate with the server 120 via a network or a special-purpose connection. The database 130 may be various types. In some embodiments, the database used by the server 120 may be a database, for example, a relational database. One or a plurality of these databases can store, update and retrieve data to and from the database in response to a command.

In some embodiments, one or more databases 130 may be also used by an application program to store data of the application program. The database used by the application program may be databases of different types, for example, a key-value storage base, an object storage base or a conventional storage base supported by a file system.

The system 100 in FIG. 1 may be configured and operated in various forms so as to apply various methods and apparatuses described according to the present disclosure.

Figure 2:
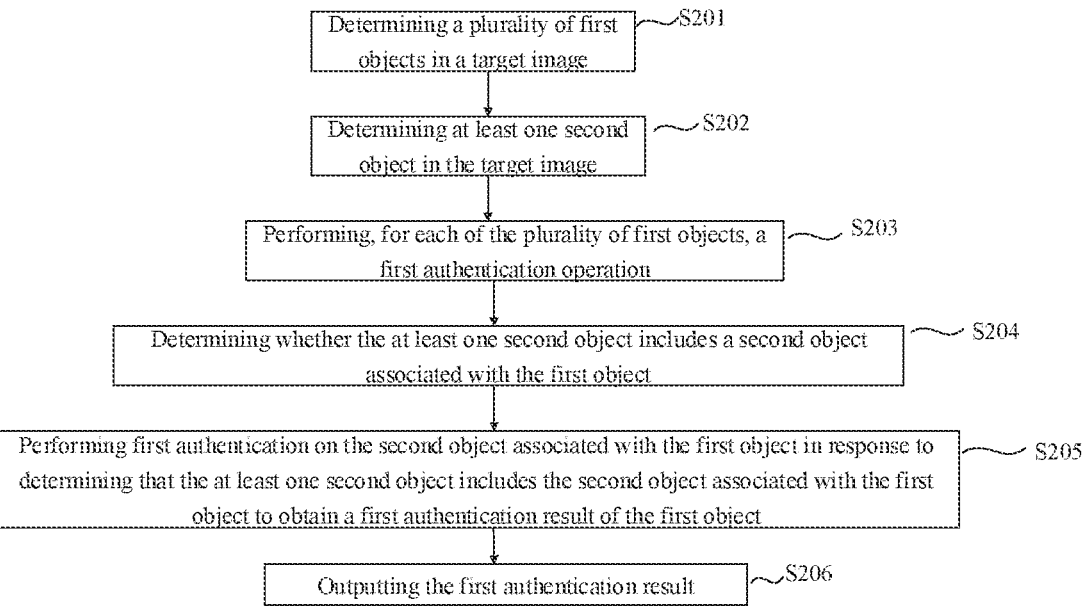
FIG. 2 shows a flowchart of an information authentication method according to an example embodiment of the present disclosure.

According to an aspect of the present disclosure, an information authentication method is provided. As shown in FIG. 2, the information authentication method includes: step S201, a plurality of first objects in a target image are determined; step S202, at least one second object in the target image is determined; and step S203, for each of the plurality of first objects, a first authentication operation is performed; step S204, whether the at least one second object includes a second object associated with the first object is determined; step S205, first authentication is performed on the second object associated with the first object in response to determining that the at least one second object includes the second object associated with the first object to obtain a first authentication result of the first object; and step S206, the first authentication result is output.

In this way, by determining the plurality of first objects (for example, a human face) and at least one second object (for example, information to be authenticated such as a pass code, a certificate and the like) in the target image, determining a second object associated with the first objects among the at least one second object, and then performing authentication on these second objects so that a corresponding first authentication result is obtained and output, information authentication is realized for second objects associated with a plurality of first objects respectively at the same time. Compared with performing authentication on the second objects associated with the plurality of first objects respectively one by one, the method of the present disclosure can improve processing efficiency of information authentication and meanwhile improve user experience.

According to some embodiments, the target image may be, for example, a single sheet of image photographed by an image capturing device, or one frame of continuous video frames, and includes but is not limited to one frame of stored historical continuous video frames and one frame of real-time collected continuous video frames, which is not limited herein. It can be understood that the information authentication method provided by the present disclosure can process each frame among the continuous video frames in real time or perform processing by drawing a frame.

According to some embodiments, the first object may be, for example, persons in the target image, or human faces of these persons. The second object may be, for example, information to be authenticated shown by these persons, for example, a pass code, a certificate, a diploma, an employment separation certificate, etc., which is not limited herein. In some example embodiments, the second object may also include a human face, for example, a user face image in the pass code, an identification photo in a certificate, etc.

According to some embodiments, a face recognition and detection technology can be adopted in step S201, determining the plurality of first objects in the target image. In an example embodiment, as shown in FIG. 3, a plurality of detection boxes 308, 310 and 312 surrounding a plurality of user faces 302, 304 and 306, respectively, can be determined in the target image 300 by using a face recognition and detection technology based on deep learning, and these human faces are used as the first objects.

According to some embodiments, a target detection technology can be adopted in step S202, determining the at least one second object in the target image. In an example embodiment, as shown in FIG. 3, a plurality of detection boxes 314 and 316 surrounding a plurality of information to be authenticated 318 and 320 such as pass codes, certificates can be determined in the target image by using a target detection technology based on deep learning, and these information to be authenticated is used as the second objects.

According to some embodiments, step S204, determining whether the at least one second object includes the second object associated with the first object may, for example, include: whether the at least one second object includes the second object associated with the first object is determined at least based on a relative position of each of the at least one second object and the first object. In general cases, when the user performs information authentication, the information to be authenticated shown by the user is closer to the human face of the user. Therefore, by determining a relative position relation between the plurality of first objects (for example, human faces) and the at least one second object (for example, the information to be authenticated), an association relation between the first object and the second object can be determined fast.

Figure 3:
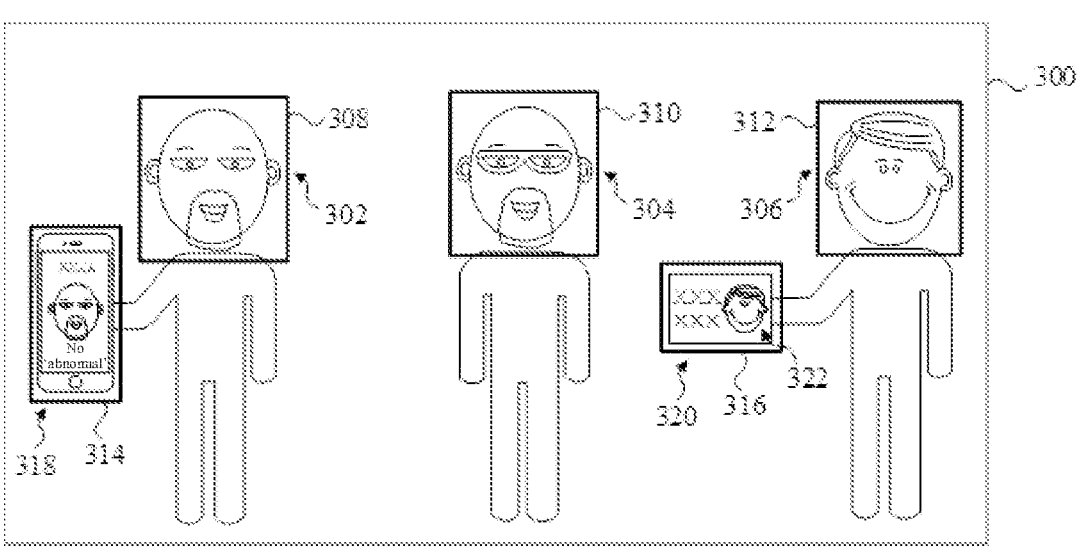
FIG. 3 shows a schematic diagram of a first object and a second object in a target image according to an example embodiment of the present disclosure.

In an example embodiment, as shown in FIG. 3, a human face 302 of a user on a left side is closer to a pass code 318 hand-held by the user, and meanwhile a human face 306 of a user on a right side is closer to certificate information 320 hand-held by the user. By using proximity association, the pass code 318 can be successfully matched with the first object 302, and the certificate information 320 is matched with the first object 306.

According to some embodiments, step S204, determining whether the at least one second object includes the second object associated with the first object may, for example, include: whether the at least one second object includes a second object associated with the first object is determined at least based on a matching degree between a human face included by each of the at least one second object and the first object. Under the condition that many users perform information authentication at the same time, more first objects and second objects will appear in the target image. In this case, a large error may occur in determining association relations between the first objects and the second objects based on the relative positions. Considering that the second object usually carries a human face image, the human face image in the second object can be used to be matched with the first object, and the second object associated with the first object is determined according to a matched degree. Therefore, by using human face-based matching, a more accurate association result between the plurality of first objects and the at least one second object can be obtained.

In an example embodiment, as shown in FIG. 3, the distance between the certificate information 320 hand-held by the user on a right side and the human face 304 of the user in the middle is similar to the distance between the certificate information 320 hand-held by the user on a right side and to the human face 306 of the user on the right side. If the user in the middle moves rightwards at the moment, an erroneous association may occur. Therefore, the human face image 322 in the certificate information 320 may be used for matching with the human face 306 of the user on the right side or the human face 304 of the user in the middle, and then the certificate information 320 may be successfully associated with the first object 306.

Figure 4:
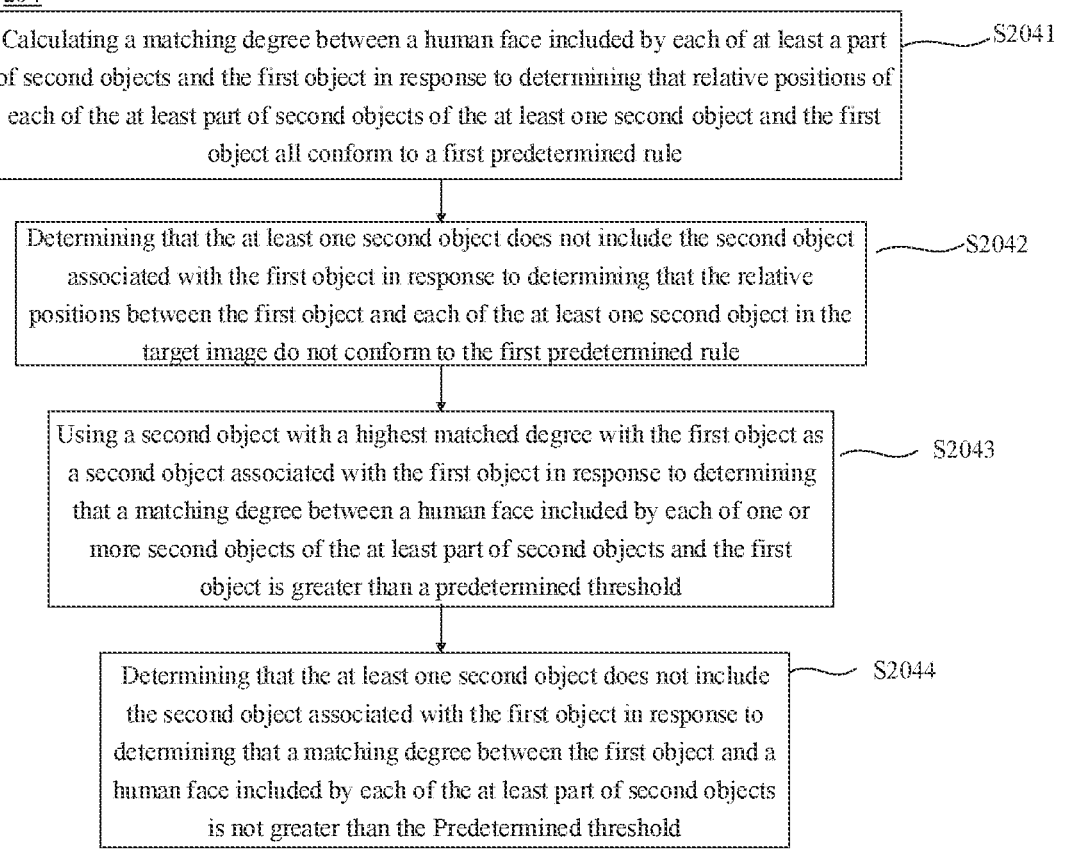
FIG. 4 shows a flowchart of determining whether at least one second object includes a second object associated with a first object according to an example embodiment of the present disclosure.

According to some embodiments, as shown in FIG. 4, step S204, determining whether the at least one second object includes the second object associated with the first object may, for example, include: step S2041, a matching degree between a human face included by each of at least a part of second objects and the first object is calculated in response to determining that relative positions between the first object and each of the at least part of second objects of the at least one second object conform to a first predetermined rule; and step S2043, a second object with a highest matched degree with the first object is used as a second object associated with the first object in response to determining that a matching degree between the first object and the human face included by each of one or more second objects of the at least part of second objects is greater than a predetermined threshold. Therefore, by firstly screening the second objects based on the relative positions, then calculating the human face matching degree between the first object and each of the at least part of the screened second objects, and selecting the second object associated with the first object according to the human face matching degree, the association method for the first object and the second object is optimized, achieving a balance between processing speed and association accuracy.

According to some embodiments, the first predetermined rule may include: a distance between a corresponding first object and a corresponding second object is smaller than a predetermined distance. In this way, by adopting the first predetermined rule, cases that information to be authenticated shown by other users farther away from the user being associated with the user can be avoided. It can be understood that those skilled in the art may set the predetermined distance by themselves, or may also adopt other reasonable first predetermined rules for limiting the relative position relation between the user face and the information to be authenticated shown by the user, which is not limited herein.

According to some embodiments, as shown in FIG. 4, step S204, determining whether the at least one second object includes the second object associated with the first object may, for example, further include: step S2042, it is determined that the at least one second object does not include the second object associated with the first object in response to determining that the relative positions between the first object and each of the at least one second object in the target image do not conform to the first predetermined rule. Therefore, the second object whose relative position relations with the first object is unreasonable can be excluded.

According to some embodiments, as shown in FIG. 4, step S204, determining whether the at least one second object includes the second object associated with the first object may, for example, further include: step S2044, it is determined that the at least one second object does not include the second object associated with the first object in response to determining that a matching degree between the first object and the human face included by each of the at least one part of second objects is not greater than the predetermined threshold. In this way, a second object having a low matched degree with the human face of the first object can be excluded.

Figure 5:
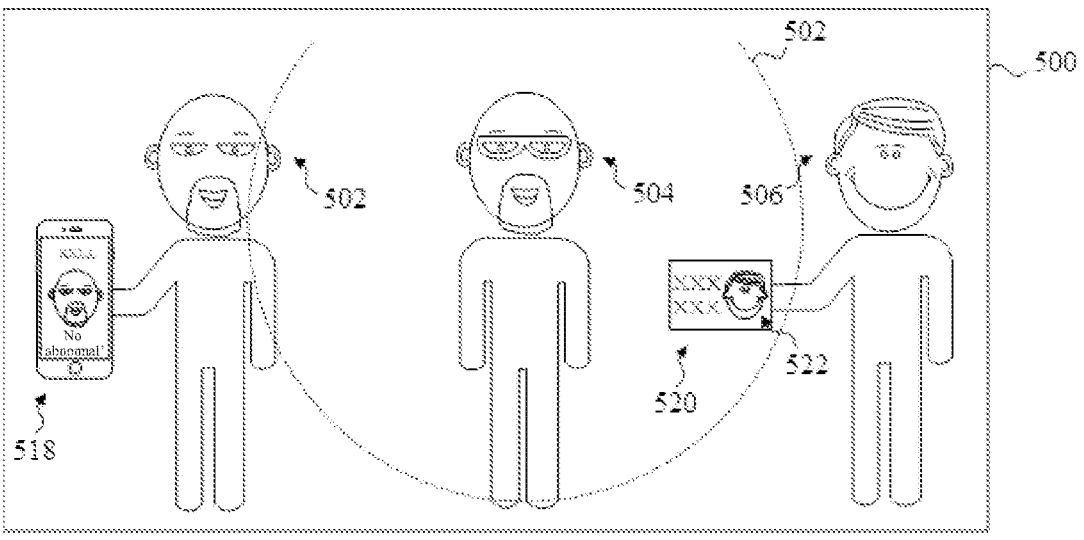
FIG. 5 shows a schematic diagram of determining whether at least one second object includes a second object associated with a first object according to an example embodiment of the present disclosure.

Step S204 is described in detail below with reference to an example embodiment. As shown in FIG. 5, as for a human face (a first object) 504 of the user in the middle, the inner side of the dotted line 502 represents a range for a second object that is conforming to the first predetermined rule with respect of the first object 504. In this way, at least a part of second objects 520 whose relative positions with the first object 504 conform to the first predetermined rule is determined among the at least one second object 518 and 520. Then the matching degree between the human face 522 included in the at least part of second objects 520 and the first object 504 is calculated. As the matching degree between the human face 522 and the first object 504 is low (lower than a predetermined threshold), it can be determined that the at least one second object 518 and 520 in the target image 500 does not include the second object associated with the first object 504.

According to some embodiments, the first authentication operation may further include: the user is prompted that the first authentication is already completed in response to detecting that the first object has performed the first authentication operation and already passed the first authentication; and whether the at least one second object includes the second object associated with the first object is determined in response to detecting that the first object has performed the first authentication operation and does not pass the first authentication, and then the first authentication operation continues to be performed. It can be understood that regarding the above prompt for completing the first authentication, those skilled in the art can set a corresponding prompting method and a prompting content by themselves, which is not limited herein.

Figure 6:
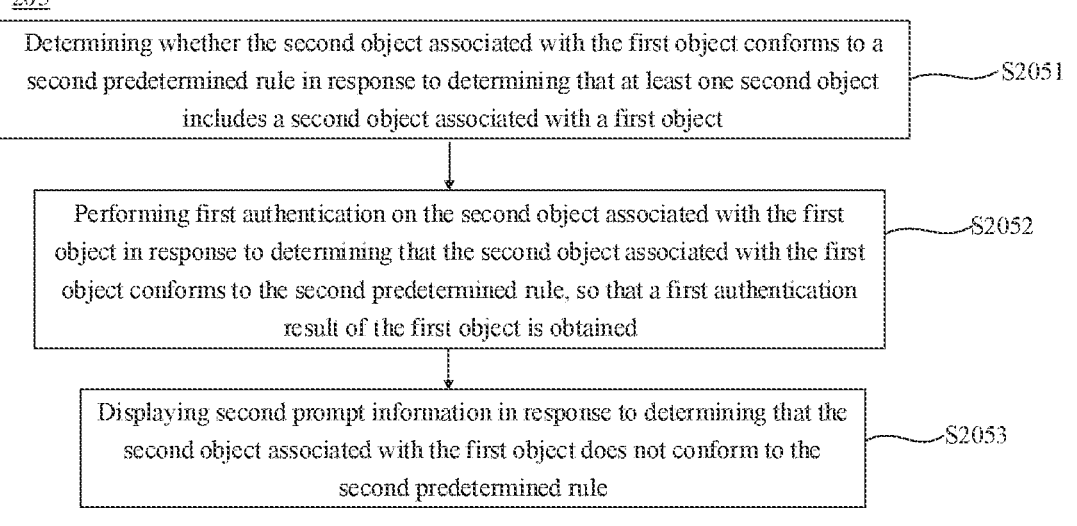
FIG. 6 shows a flowchart of performing a first authentication on a second object associated with a first object according to an example embodiment of the present disclosure.

According to some embodiments, as shown in FIG. 6, step S205, performing first authentication on the second object associated with the first object may include: step S2051, whether the second object associated with the first object conforms to a second predetermined rule is determined in response to determining that the at least one second object includes the second object associated with the first object; and step S2052, first authentication is performed on the second object associated with the first object in response to determining that the second object associated with the first object conforms to the second predetermined rule, so that the first authentication result of the first object is obtained. In this way, by first determining whether the second object complies with the second predetermined rule for judging whether it can be accurately identified, and then performing the first authentication, intelligence of the information authentication method and interactivity with the user are improved, thereby improving the authentication accuracy and enhancing the user experience.

According to some embodiments, the second predetermined rule may include at least one of: a distance between a corresponding second object and a shooting unit is within a predetermined distance range; an angle formed by the corresponding second object and the shooting unit is within a predetermined angle range; and the corresponding second object is uncovered. It can be understood that those skilled in the art can set the above-mentioned predetermined distance range and the above-mentioned predetermined angle range by themselves, or set a more reasonable second predetermined rule freely, thereby enabling to extract accurate information from a second object for authentication, which is not limited herein.

According to some embodiments, as shown in FIG. 6, step S205, performing first authentication on the second object associated with the first object may further include: step S2053, second prompt information is displayed in response to determining that the second object associated with the first object does not conform to the second predetermined rule. In an example embodiment, the second prompt information may, for example, include prompting the user to approach or move away from the shooting unit, prompting the user to face the corresponding second object directly to the shooting unit, and prompting the user not to cover the second object, etc., which is not limited herein.

According to some embodiments, as shown in FIG. 7, the first authentication operation may further include: step S703, first prompt information is displayed in response to determining that the at least one second object does not include the second object associated with the first object. Operations of step S701, S702 and S704 in FIG. 7 are similar to operations of steps S204-S206 in FIG. 2 and are not described in detail. In an example embodiment, the first prompt information may, for example, include prompting the user to display the second object.

According to some embodiments, step S704, outputting the first authentication result may include at least one of: the first authentication result is displayed; the first authentication result is voice broadcasted, and the first authentication result is sent to an electronic device associated with the first object. Therefore, through a variety of output methods, the user can conveniently receive the first authentication result. The way of output can also be selected according to the scene, so as to ensure that the user knows the first authentication result while protecting the user's privacy.

According to some embodiments, in a scene with many users, a plurality of authentication results and prompt information specific to different users may be generated in short time. In this case, these authentication results and prompt information needs to be prioritized, and contents with a higher priority can be broadcast first. It can be understood that those skilled in the art can set the priority order of different authentication results and prompt information by themselves according to requirements, which is not limited herein.

According to difference of the second objects, the first authentication result may include different contents. In an example embodiment, when the second object is a pass, first authentication performed on the second object may, for example, include authentication of time of the pass, authentication of whether the state of the pass is 'normal' or 'abnormal', authentication of the layout of the pass, etc., and the first authentication result may, for example, include "pass authentication passed", "pass expired", "pass is 'abnormal', "wrong layout", etc. In another example embodiment, when the second object is a certificate (or a license, a permit or the like), first authentication performed on the second object may include authentication of various information and its authenticity on the certificate, and the details are omitted. It can be understood that those skilled in the art can select a second object for which information authentication needs to be performed, and can design the content of the first authentication on the second object and the corresponding first authentication result by themselves, and these solutions are within the protection scope of the present disclosure.

According to some embodiments, as shown in FIG. 7, the first authentication operation may further include: step S705, at least one of the region corresponding to the first object in the target image and the first authentication result is printed in response to determining that the second object associated with the first object passes first authentication. In this way, by printing the first authentication result, repeated authentication of the first object in multiple positions such as the conference venue, the office area is avoided, and an authentication process and operations are simplified. By printing the region corresponding to the first object in the target image (i.e., a user image photographed on the spot on the day), it enables the staff located at, for example, the entrance to a higher security level area that requires human verification to determine user's identity based on the printed user image, thereby enhancing security. It can be understood that these contents may also be stored and displayed in other ways for the user to use. For example, they may be sent to an electronic device such as a mobile phone of the user, which is not limited herein.

In an example embodiment, as shown in FIG. 8, authentication result information 800 may be, for example, a printed paper material, or electronic information, or other media capable of being displayed, which is not limited herein. The authentication result information 800 includes the first authentication result 802 and a content 304 that is same as the region 312 corresponding to the first object 306 in the target image 300. Besides, the authentication result information 800 further includes a user name 804 and a date 806. It can be understood that the authentication result information may also include richer text information, image information, graphic codes (e.g., barcodes and QR codes), etc., which is not limited herein.

Figure 9:
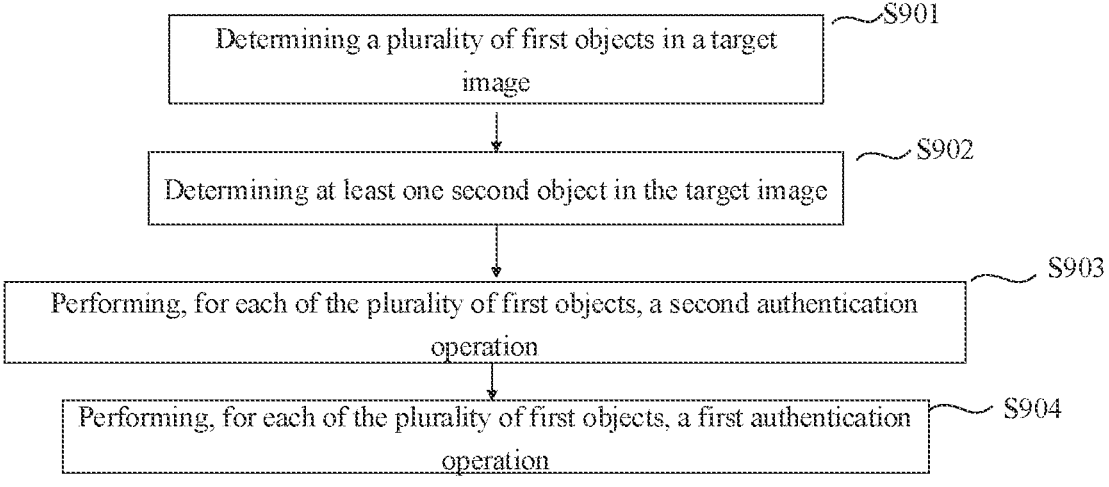
FIG. 9 shows a flowchart of an information authentication method according to an example embodiment of the present disclosure.

According to some embodiments, as shown in FIG. 9, the information authentication method may further include step S903, for each of the plurality of first objects, a second authentication operation is performed before performing the first authentication operation; and step S904, for each of the plurality of first objects, the first authentication operation is performed in response to determining that the first object passes second authentication. The second authentication operation may include: performing second authentication on the first object to obtain a second authentication result of the first object; and outputting the second authentication result. Operations of steps S901-S902 in FIG. 9 are similar to operations of steps S201-S202 in FIG. 2 and are not described in detail. Therefore, by performing second authentication (for example, face recognition) on the plurality of first objects and then performing the first authentication operation on the first object that have passed the second authentication, the computational cost of the authentication process is reduced, authentication speed and efficiency are further improved, and the user experience is improved.

According to some embodiments, the second authentication may be, for example, face recognition for the first object, and recognition and authentication can be performed on the first object according to face data in a database. The second authentication operation can be performed on the first object in response to determining that the first object is successfully matched with the face data in the database and being determined that other information of the user meet predetermined requirements. A prompt is made according to corresponding predetermined requirements in response to the successful matching between the first object and the face data in the database but other information of the user does not meet the predetermined requirements. In an example embodiment, the information authentication method is used for employee onboarding. When a new employee checks in at the wrong check-in place, although the face data of the new employee is stored in the database, the predetermined requirements are not met since the new employee is located at the wrong place. At this time, the new employee can be prompted that the registration place is wrong and a correct registration place can be displayed, broadcast or sent to an electronic device of the new employee. In response to that the first object is not matched with any face data in the database, the user can be prompted that face authentication fails and the user can be prompted to seek for manual help.

According to some embodiments, in response to determining that the first object is successfully matched with the face data in the database, a corresponding content can be output according to specific information of the user corresponding to the first object. In an example embodiment, the specific information of the user indicates that the birthday of the user is within the next week, a corresponding birthday congratulation special effect may be displayed on the periphery of the first object, or voice broadcast may be performed. In another example embodiment, the specific information of the user indicates that the user has set a personalized display special effect, then when the human face of the user is detected, a corresponding personalized display special effect may be displayed on the periphery of the first object, and thus the user experience is improved. In another example embodiment, augmented reality technology may be used to perform authentication result display, specific information display, etc., which is not limited herein.

According to some embodiments, outputting the second authentication result may, for example, include at least one of a plurality of: displaying the second authentication result; performing voice broadcast the second authentication result; and sending the second authentication result to the electronic device associated with the first object. Therefore, through a variety of output methods, the user can conveniently receive the second authentication result, and an appropriate way of output can be selected according to the scene, so as to ensure that the user knows the second authentication result.

According to some embodiments, after outputting the second authentication result, third prompt information can be output to indicate the user to show information to be authenticated.

According to some embodiments, the first authentication operation may further include: in response to determining that the second object associated with the first object passes first authentication, at least one of a region corresponding to the first object in the target image, the first authentication result and the second authentication result is printed. Therefore, by printing the second authentication result, the information amount of printed authentication result information is increased.

Figure 10:
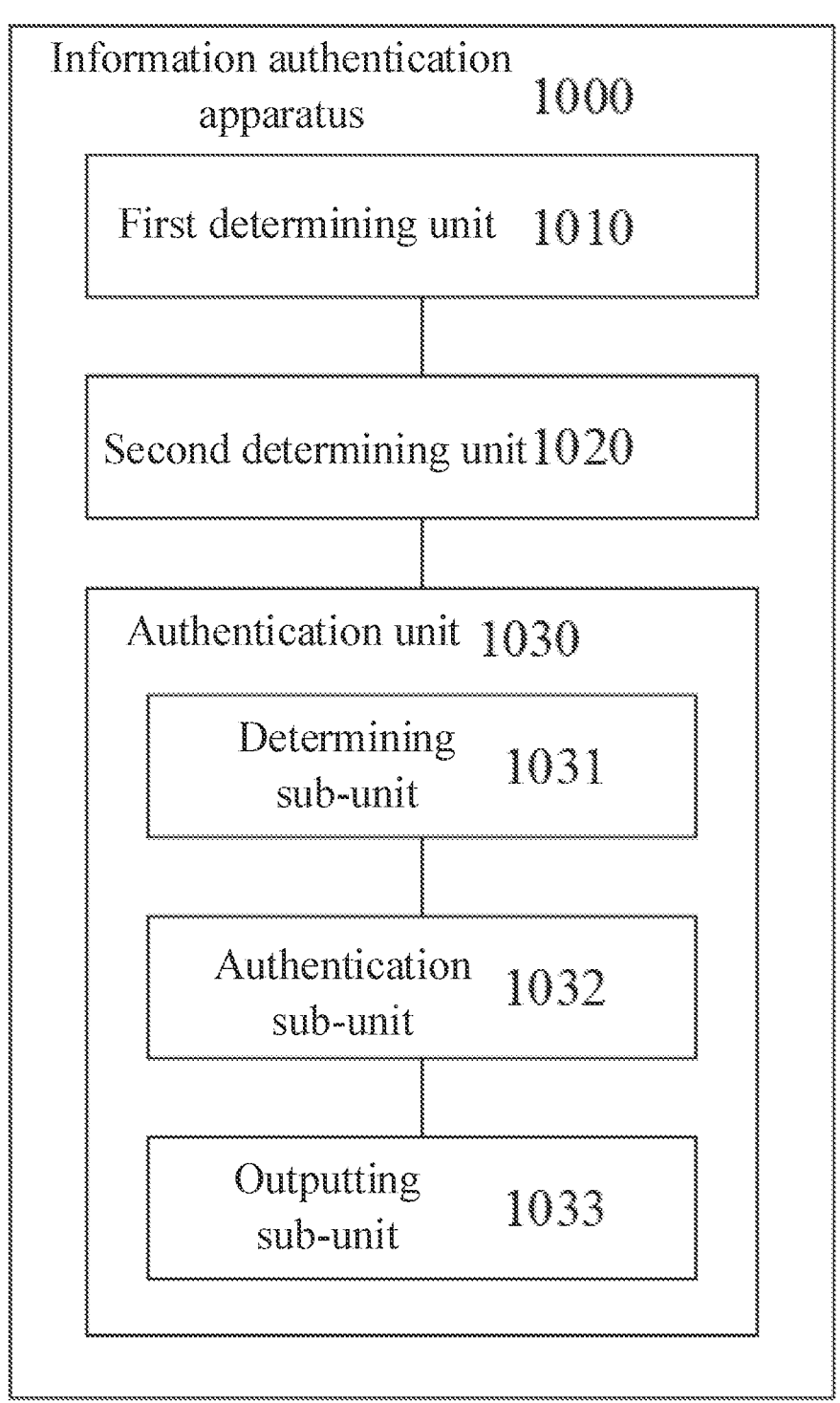
FIG. 10 shows a structural block diagram of an information authentication apparatus according to an example embodiment of the present disclosure.

According to another aspect of the present disclosure, an information authentication apparatus is further provided. As shown in FIG. 10, the information authentication apparatus 1000 includes: a first determining unit 1010, configured to determine a plurality of first objects in a target image; a second determining unit 1020, configured to determine at least one second object in the target image; and an authentication unit 1030, configured to perform a first authentication operation for each of the plurality of first objects. The authentication unit 1030 includes: a determining sub-unit 1031, configured to determine whether the at least one second object includes a second object associated with the first object; an authentication sub-unit 1032, configured to perform first authentication on the second object associated with the first object in response to determining that the at least one second object includes the second object associated with the first object to obtain a first authentication result of the first object; and an outputting sub-unit 1033, outputting the first authentication result.

Operations of the unit 1010 to the unit 1030 of the information authentication apparatus 1000 and the sub-unit 1031 to the sub-unit 1033 of the authentication unit 1030 are respectively similar to operations of step S201 to step S206 of the above information authentication method, which is not described in detail.

In the technical solution of the present disclosure, collection, saving, application, processing, transmission, providing, revealing and other processing of user personal information involved are all in compliance with the relevant laws and regulations, and do not violate public order and good morals.

According to an embodiment of the present disclosure, an electronic device, a readable storage medium and a computer program product are further provided.

Figure 11:
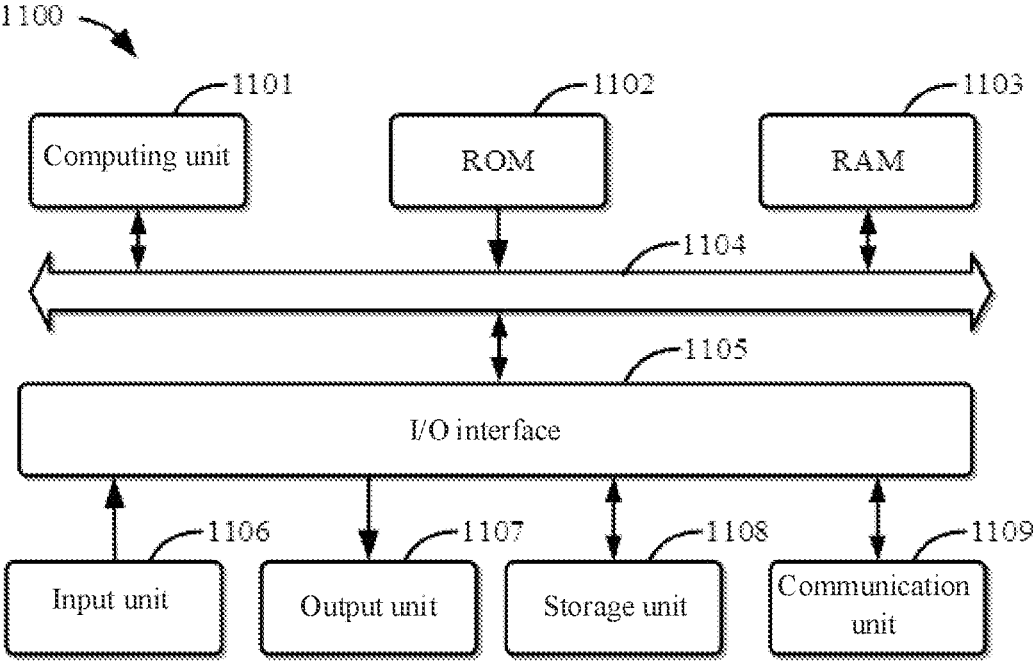
FIG. 11 shows a structural block diagram of an example electronic device capable of being used for implementing embodiments of the present disclosure.

Referring to FIG. 11, a structural block diagram of an electronic device 1100 capable of serving as a server or a client of the present disclosure is described now, which is an example of a hardware device applicable to various aspects of the present disclosure. The electronic device intends to represent various digital electronic computer devices, such as a laptop computer, a desktop computer, a workbench, a personal digital assistant, a server, a blade server, a mainframe computer and other suitable computers. The electronic device may also represent various mobile devices, such as a personal assistant, a cell phone, a smartphone, a wearable device and other similar computing apparatuses. Components shown herein, their connections and relations and their functions are only examples and do not intend to limit implementation of the present disclosure described and/or required herein.

As shown in FIG. 11, the device 1100 includes a computing unit 1101, which can execute various appropriate actions and processing according to a computer program stored in a read-only memory (ROM) 1102 or a computer program loaded from a storage unit 1108 to a random access memory (RAM) 1103. The RAM 1103 can also store various programs and data needed by operations of the device 1100. The computing unit 1101, the ROM 1102 and the RAM 1103 are mutually connected through a bus 1104. An input/output (I/O) interface 1105 is also connected to the bus 1104.

A plurality of components in the device 1100 are connected to the I/O interface 1105, including: an input unit 1106, an output unit 1107, the storage unit 1108, and a communication unit 1109. The input unit 1106 may be any type of devices capable of inputting information to the device 1100 and can receive input number or character information and generate key signal input related to user setting and/or function control of the electronic device and can include but is not limited to a mouse, a keyboard, a touch screen, a trackpad, a trackball, a joystick, a microphone and/or a remote-control unit. The output unit 1107 may be any type of device capable of displaying information and may include but is not limited to a display, a speaker, a video/audio output terminal, a vibrator and/or a printer. The storage unit 1108 may include but is not limited to a magnetic disk and a compact disc. The communication unit 1109 may allow the device 1100 to exchange information/data with other devices through a computer network, such as Internet, and/or various telecommunication networks and may include but is not limited to a modem, a network card, an infrared communication device, a wireless communication transceiver and/or a chipset, for example, a Bluetooth™ device, a 802.11 device, a WiFi device, a WiMax device, a cellular communication device and/or similar items.

The computing unit 1101 may be various general-purpose and/or special-purpose processing components with processing and computing capacity. Some examples of the computing unit 1101 include but are not limited to a central processing unit (CPU), a graphics processing unit (GPU), various special-purpose artificial intelligence (AI) computing chips, various computing units for running a machine learning model algorithm, a digital signal processor (DSP), and any appropriate processor, controller, microcontroller and the like. The computing unit 1101 executes each method and processing described above, for example, the image processing method. For example, in some embodiments, the image processing method may be realized as a computer software program, which is tangibly contained in a machine readable medium, for example, the storage unit 1108. In some embodiments, a part of or all of the computer program may be loaded and/or installed onto the device 1100 via the ROM 1102 and/or the communication unit 1109. When the computer program is loaded to the RAM 1103 and executed by the computing unit 1101, one or more steps of the image processing method described above can be executed. Alternatively, in other embodiments, the computing unit 1101 may be configured to execute the image processing method in any other appropriate mode (for example, by means of firmware).

Various implementations of the systems and technologies described above in this paper may be implemented in a digital electronic circuit system, an integrated circuit system, a field programmable gate array (FPGA), an application specific integrated circuit (ASIC), an application specific standard part (ASSP), a system on chip (SOC), a load programmable logic device (CPLD), computer hardware, firmware, software and/or their combinations. These various implementations may include: being implemented in one or more computer programs, wherein the one or more computer programs may be executed and/or interpreted on a programmable system including at least one programmable processor, and the programmable processor may be a special-purpose or general-purpose programmable processor, and may receive data and instructions from a storage system, at least one input apparatus, and at least one output apparatus, and transmit the data and the instructions to the storage system, the at least one input apparatus, and the at least one output apparatus.

Program codes for implementing the methods of the present disclosure may be written in any combination of one or more programming languages. These program codes may be provided to processors or controllers of a general-purpose computer, a special-purpose computer or other programmable data processing apparatuses, so that when executed by the processors or controllers, the program codes enable the functions/operations specified in the flow diagrams and/ or block diagrams to be implemented. The program codes may be executed completely on a machine, partially on the machine, partially on the machine and partially on a remote machine as a separate software package, or completely on the remote machine or server.

In the context of the present disclosure, a machine readable medium may be a tangible medium that may contain or store a program for use by or in connection with an instruction execution system, apparatus or device. The machine readable medium may be a machine readable signal medium or a machine readable storage medium. The machine readable medium may include but not limited to an electronic, magnetic, optical, electromagnetic, infrared, or semiconductor system, apparatus or device, or any suitable combination of the above contents.

More specific examples of the machine readable storage medium will include electrical connections based on one or more lines, a portable computer disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above contents.

In order to provide interactions with users, the systems and techniques described herein may be implemented on a computer, and the computer has: a display apparatus for displaying information to the users (e.g., a CRT (cathode ray tube) or LCD (liquid crystal display) monitor); and a keyboard and a pointing device (e.g., a mouse or trackball), through which the users may provide input to the computer. Other types of apparatuses may further be used to provide interactions with users; for example, feedback provided to the users may be any form of sensory feedback (e.g., visual feedback, auditory feedback, or tactile feedback); an input from the users may be received in any form (including acoustic input, voice input or tactile input).

The systems and techniques described herein may be implemented in a computing system including background components (e.g., as a data server), or a computing system including middleware components (e.g., an application server) or a computing system including front-end components (e.g., a user computer with a graphical user interface or a web browser through which a user may interact with the implementations of the systems and technologies described herein), or a computing system including any combination of such background components, middleware components, or front-end components. The components of the system may be interconnected by digital data communication (e.g., a communication network) in any form or medium. Examples of the communication network include: a local area network (LAN), a wide area network (WAN) and the Internet.

A computer system may include a client and a server. The client and the server are generally away from each other and usually interact through a communication network. A relation between the client and the server is generated by running a computer program with a mutual client-server relation on a corresponding computer. The server may be a cloud server, also called a cloud computing server or a cloud host, which is a host product in a cloud computing service system so as to overcome defects of high management difficulty and weak business expansibility in services of a traditional physical host and the Virtual Private Server (VPS). The server may also be a server of a distributed system, or a server combined with a blockchain.

It should be understood that steps can be reranked, added or deleted by using various forms of flows shown above. For example, all the steps recorded in the present disclosure can be executed in parallel, or in sequence or in different orders, which is not limited herein as long as a desired result of the technical solutions disclosed by the present disclosure can be realized.

Though the embodiments or the examples of the present disclosure are already described with reference to the drawings, it should be understood that the above method, system or device is only an example embodiment or example, and the scope of present disclosure is not limited by these embodiments or examples but limited only by the scope of the authorized claims and their equivalents. Various elements in the embodiments or the examples may be omitted or replaced by their equivalent elements. Besides, all the steps may be executed in sequence different from a sequence described in the present disclosure. Furthermore, various elements in the embodiments or the examples may be combined in various modes. What counts is that with technology evolution, many elements described here can be replaced by equivalent elements appearing after the present disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented information authentication method, comprising:

determining a plurality of first objects in a target image, wherein the target image includes a plurality of persons, and the plurality of first objects are a plurality of human faces of the plurality of persons;

determining a plurality of second objects in the target image, wherein the plurality of second objects is information to be authenticated, and each second object of the plurality of second objects comprises a human face; and performing, for each first object of the plurality of first objects, a second authentication operation comprising:

matching the first object with face data in a database;

in response that the first object is successfully matched with the face data in the database, performing a first authentication operation comprising:

determining whether the plurality of second objects comprises a second object associated with the first object, comprising:

determining the distance between each of the plurality of second objects and the first object;

determining at least two candidate objects from the plurality of second objects, wherein a distance between each of the at least two candidate objects and the first object is smaller than a predetermined distance;

calculating a matching degree between a human face comprised by each of the at least two candidate objects and the first object; and in response to determining that the matching degree between the human face comprised by each of the at least two candidate objects and the first object is greater than a predetermined threshold, determining a candidate object having a highest matching degree as the second object associated with the first object;

in response to determining that the plurality of second objects comprises the second object associated with the first object, performing first authentication on the second object associated with the first object, to obtain a first authentication result of the first object; and outputting the first authentication result.

2. The method according to claim 1, wherein determining whether the plurality of second objects comprises the second object associated with the first object comprises:

determining whether the plurality of second objects comprises the second object associated with the first object at least based on a relative position of each of the plurality of second objects and the first object.

3. The method according to claim 1, wherein outputting the first authentication result comprises at least one of the following items:

displaying the first authentication result;

performing voice broadcast on the first authentication result; and sending the first authentication result to an electronic device associated with the first object.

4. The method according to claim 1, wherein the first authentication operation further comprises:

printing at least one of a region corresponding to the first object in the target image and the first authentication result in response to determining that the second object associated with the first object passes first authentication.

5. The method according to claim 1, wherein the first authentication operation further comprises:

displaying first prompt information in response to determining that the plurality of second objects does not comprise a second object associated with the first object.

6. The method according to claim 1, wherein performing first authentication on the second object associated with the first object comprises:

determining whether the second object associated with the first object conforms to a second predetermined rule in response to determining that the plurality of second objects comprises the second object associated with the first object; and performing the first authentication on the second object associated with the first object in response to determining that the second object associated with the first object conforms to the second predetermined rule to obtain the first authentication result of the first object.

7. The method according to claim 1, wherein the second authentication operation comprises: outputting the second authentication result.

8. The method according to claim 6, wherein performing the first authentication on the second object associated with the first object further comprises:

displaying second prompt information in response to determining that the second object associated with the first object does not conform to the second predetermined rule.

9. The method according to claim 6, wherein the second predetermined rule comprises at least one of the following items:

a distance between a corresponding second object and a shooting unit being within a predetermined distance range;

an angle formed by the corresponding second object and the shooting unit being within a predetermined angle range; and the corresponding second object being uncovered.

10. The method according to claim 7, wherein outputting the second authentication result comprises at least one of a plurality of following items:

displaying the second authentication result;

performing voice broadcast on the second authentication result; and sending the second authentication result to an electronic device associated with the first object.

11. The method according to claim 7, wherein the first authentication operation further comprises:

printing at least one of a region corresponding to the first object in the target image, the first authentication result and the second authentication result in response to determining that the second object associated with the first object passes first authentication.

12. An electronic device, the device comprising:

one or more processors; and a non-transitory memory storing one or more programs configured to be performed by the one or more processors, the one or more programs comprising instructions for:

determining a plurality of first objects in a target image, wherein the target image includes a plurality of persons, and the plurality of first objects are a plurality of human faces of the plurality of persons;

determining a plurality of second objects in the target image, wherein the plurality of second objects is information to be authenticated, and wherein each second object of the plurality of second objects comprises a human face; and performing, for each first object of the plurality of first objects, a second authentication operation comprising:

matching the first object with face data in a database;

in response that the first object is successfully matched with the face data in the database, performing a first authentication operation comprising:

determining whether the plurality of second objects comprises a second object associated with the first object, comprising:

determining the distance between each of the plurality of second objects and the first object;

determining at least two candidate objects from the plurality of second objects, wherein a distance between each of the at least two candidate objects and the first object is smaller than a predetermined distance;

calculating a matching degree between a human face comprised by each of the at least two candidate objects and the first object; and in response to determining that the matching degree between the human face comprised by each of the at least two candidate objects and the first object is greater than a predetermined threshold, determining a candidate object having a highest matching degree as the second object associated with the first object;

in response to determining that the plurality of second objects comprises the second object associated with the first object, performing first authentication on the second object associated with the first object, to obtain a first authentication result of the first object; and outputting the first authentication result.

13. A non-transitory computer readable storage medium storing one or more programs, the one or more programs comprising instructions, which when performed by one or more processors of an electronic device, cause the electronic device to:

determine a plurality of first objects in a target image, wherein the target image includes a plurality of persons, and the plurality of first objects are a plurality of human faces of the plurality of persons;

determine a plurality of second objects in the target image, wherein the plurality of second objects is information to be authenticated, and each second object of the plurality of second objects comprises a human face; and perform, for each first object of the plurality of first objects, a second authentication operation comprising:

match the first object with face data in a database;

in response that the first object is successfully matched with the face data in the database, perform a first authentication operation comprising:

determining whether the plurality of second objects comprises a second object associated with the first object, comprising:

determining the distance between each of the plurality of second objects and the first object;

determining at least two candidate objects from the plurality of second objects, wherein a distance between each of the at least two candidate objects and the first object is smaller than a predetermined distance;

calculating a matching degree between a human face comprised by each of the at least two candidate objects and the first object; and in response to determining that the matching degree between the human face comprised by each of the at least two candidate objects and the first object is greater than a predetermined threshold, determining a candidate object having a highest matching degree as the second object associated with the first object;

in response to determining that the plurality of second objects comprises the second object associated with the first object, performing first authentication on the second object associated with the first object, to obtain a first authentication result of the first object; and outputting the first authentication result.

\* \* \* \* \*